United States Patent

Lemelson

[15] 3,683,471
[45] Aug. 15, 1972

[54] CONTINUOUS MANUFACTURING PROCESSES AND APPARATUS

[72] Inventor: Jerome H. Lemelson, 85 Rector St., Metuchen, N.J. 08840

[22] Filed: March 27, 1969

[21] Appl. No.: 811,172

Related U.S. Application Data

[63] Continuation-in-part of Ser. No. 501,174, Oct. 22, 1965, abandoned, which is a continuation-in-part of Ser. No. 393,292, Aug. 31, 1964, Pat. No. 3,594,254, which is a continuation-in-part of Ser. No. 734,686, June 5, 1968.

[52] U.S. Cl. ..................29/33 C, 18/2 HA, 72/8, 72/256
[51] Int. Cl. ............................................B21c 31/00
[58] Field of Search ........29/33.3; 72/8, 12, 2.56, 27, 72/7; 164/154, 283; 18/2 HA

[56] References Cited

UNITED STATES PATENTS

| | | | |
|---|---|---|---|
| 1,743,302 | 1/1930 | Allen | 18/2 HA |
| 2,566,854 | 9/1951 | Rhodes | 18/2 HA |
| 2,581,922 | 1/1952 | Spencer | 18/2 HA |
| 2,698,467 | 1/1955 | Tarquinee et al. | 164/283 X |
| 2,715,244 | 8/1955 | Tasker | 18/2 HA |
| 2,747,224 | 5/1956 | Koch et al. | 18/2 HA |
| 3,000,438 | 9/1961 | Alexander | 18/2 HA |
| 3,002,615 | 10/1961 | Lemelson | 18/2 HA X |
| 3,151,508 | 10/1964 | Holman et al. | 18/2 HA X |
| 3,287,763 | 11/1966 | Diener | 18/2 HA X |
| 3,328,987 | 7/1967 | Feraci | 72/8 |
| 3,358,743 | 12/1967 | Adams | 164/154 |
| 3,521,696 | 7/1970 | Lowman et al. | 164/154 |

Primary Examiner—Andrew R. Juhasz
Assistant Examiner—Z. R. Bilinsky

[57] ABSTRACT

An apparatus and method are provided for continuously performing shaping and forming operation on material, such as metal or other suitable materials which may be formed continuously to a first shape through a die. After the initial forming operation, the apparatus performs one or more predetermined further forming and shaping operations on the initial shape such as continuously receiving and rolling same to reduce or change its cross section and, in so doing, to improve its physical characteristics. In a particular form of the invention, metal is first formed by extrusion to a first shape and thereafter is continuously roll formed to provide a sheet thereof. The sheet is then continuously fed to a shaping means, such as a rolling mill for forming same into a tube or pipe and the lateral edges thereof are welded or otherwise joined together.

The invention is also defined by an automatic control system for continuously controlling the multiple operations performed on the material from its initial formation in a die to its final formation and the cutting off of predetermined lengths thereof.

12 Claims, 4 Drawing Figures

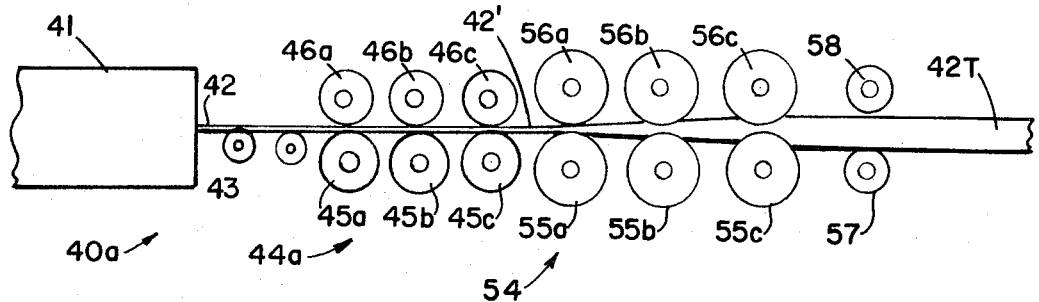
FIG.1
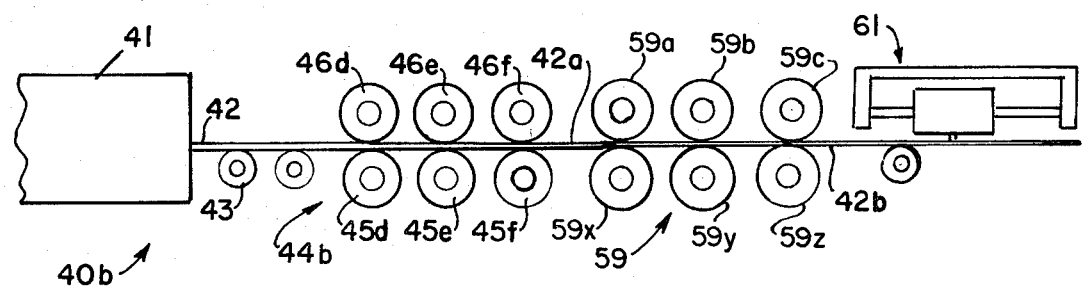
FIG.2
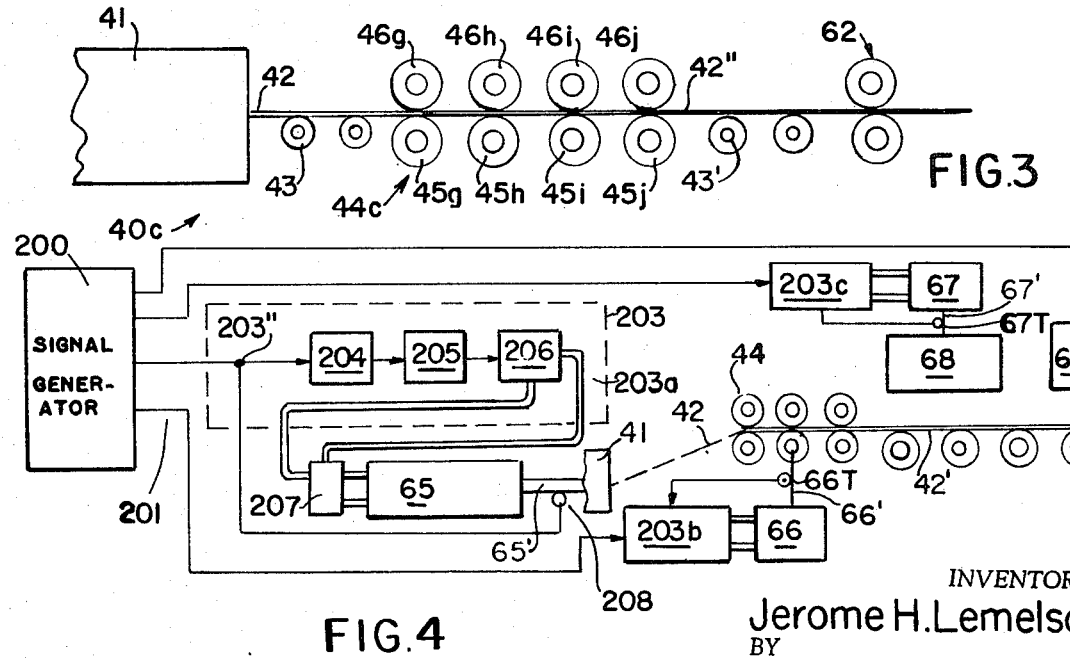
FIG.3
FIG.4
INVENTOR.
Jerome H. Lemelson
BY

CONTINUOUS MANUFACTURING PROCESSES AND APPARATUS

RELATED APPLICATIONS

This is a continuation-in-part of U.S. application Ser. No. 501,174 filed Oct. 22, 1965, now abandoned, for Continuous Manufacturing Processes and Apparatus, which was a continuation-in-part of Ser. No. 393,292 filed Aug. 31, 1964, now U.S. Pat. No. 3,594,254, and having as a parent application Ser. No. 703,523, filed Dec. 18, 1957, now U.S. Pat. No. 3,146,492. This is also a continuation-in-part of Ser. No. 734,686 filed June 5, 1968, and having as a parent application Ser. No. 142,405 filed Oct. 2, 1961, for Extrusion Apparatus, now U.S. Pat. No. 3,422,648.

SUMMARY OF THE INVENTION

This invention relates to an apparatus and method for continuously forming elongated articles of manufacture from bulk material, such as powder, pellets or billets of metals or plastic by casting or extruding same on a continuous basis through a die to a first shape and thereafter automatically and controllably operating on said first shape in such a manner as to generate a second shape thereof having predetermined physical characteristics.

It is a primary object of this invention to provide a new and improved apparatus and method for forming elongated articles of manufacture, such as tubing, pipe and other structural shapes.

Another object is to provide a continuous manufacturing apparatus and method for forming tubing of sheet metal, which sheet metal is provided on a continuous basis from the bulk form of said metal.

Another object is to provide an apparatus for continuously extruding a material which is capable of being improved or changed in its physical characteristics from the as-extruded condition and continuously receiving and operating on the extrusion to work same and provide a modified shape thereof having substantially improved physical characteristics.

Another object is to provide an apparatus for continuously forming structural shapes by performing a multiplicity of operations on a material as it is fed and providing an automatic control system, including feedback signal generating means for controlling the apparatus forming said structural shapes.

With the above and such other objects in view as may hereafter more fully appear, the invention consists of the novel constructions, combinations and arrangements of parts as will be more fully described and illustrated in the accompanying drawings, but it is to be understood that changes, variations and modifications may be resorted to which fall within the scope of the invention as claimed.

In the drawings:

FIG. 1 is a schematic side view of an apparatus for continuously forming, working and rolling sheet material into a tube;

FIG. 2 is a schematic side view of an apparatus for continuously forming a sheet or structural member and performing a plurality of secondary operations thereon after it is formed;

FIG. 3 is a schematic side view of an apparatus for continuously forming and working sheet material and performing a continuous slitting operation thereon to sever said sheet material into a plurality of strips; and FIG. 4 is a control diagram showing one form of control system applicable to the apparatus of the instant invention.

In FIG. 1 is shown an apparatus for continuously forming material such as metal or other workable material by extruding or continuously casting same and operating on said material so as to form it into a sheet of desired thickness and width. The apparatus includes means for forming the sheet, which was originally formed by rolling the extrusion or casting, into a tube or pipe.

The apparatus 40a of FIG. 1 includes a first means 41, such as an extrusion press or a continuous casting machine, which is operative to continuously form material into a first shape 42 and to pass same onto a powered take-off conveyor 43. The first shape is driven directly into a rolling mill 44a which operates to roll and reduce the thickness of said first shape to provide a sheet 42' thereof which sheet is passed directly into a tube-rolling mill 54 for continuously forming same into the shape of a tube 42T. The rolls of the sheet-rolling mill are defined by notations 46a, 46b and 46c, which may be greater in number than the three illustrated and which cooperate with respective rollers 45a, 45b and 45c in forming the extrusion or casting 42 into said sheet formation 42' which is preferably of reduced cross section and substantially improved in physical characteristics with respect to the physical characteristics of the original formation 42. The original formation 42 may be in the shape of a bar or plate which is continuously fed to the rolling mill 44a and changed in shape thereby on a continuous and controlled basis to form the sheet 42' thereof at the exit end of the rolling mill rolls.

From the rolling mill 44a, the sheet 42' is fed to a tube-rolling mill 54 of conventional design and comprising a plurality of rollers which cooperate to form by bending or rolling the sheet 42' as it is continuously fed thereto to the desired tube shape. Upper rolls 56a, 56b and 56c which may be greater in number than the three illustrated, are power operated as are the rolls of rolling mill 44a and cooperate with respective lower rolls 55a, 55b and 55c in forming the sheet 42' into a tube. The final stages of the tube-rolling mill 54 preferably include one or more sets of rolls which are operative to weld or otherwise mechanically secure the longitudinal edges of the original sheet 42' together to form a closed tube 42T. Notations 58 and 59 refer to cooperating rolls at the end of the rolling mill 54 which effect closure of the tube and, in certain instances, define respective resistance welding dies for butt welding or otherwise welding the longitudinal edges of the sheet together to form a closed tube.

The forming apparatus 40a of FIG. 1 is preferably automatically controlled to predeterminately form the raw billet or fluent extrusion material into the final product 42T by means of an automatic controller such as a computer or an arrangement of the type shown in FIG. 4, employing feedback control means for a plurality of the motors driving the powered rolls illustrated. Such means will be described hereafter and may also be provided to the embodiments illustrated in FIGS. 2 and 3.

In FIG. 2, an apparatus 40b is provided including an extrusion machine or continuous casting machine 41 for continuously forming and feeding a first shape of a material such as metal or other material capable of being worked and reduced in size, to a take-off conveyor 43. From the take-off conveyor, the shape 42 is continuously fed to a rolling mill 44*b* having rollers 46*d*, 46*e* and 46*f*, as well as additional rollers if necessary, cooperating with respective powered rollers 45*d*, 45*e* and 45*f* of said mill to continuously work and change the shape of the formation 42 to a second shape 42*a*. From the rolling mill 44*b*, the second shape 42*a* is fed to a drawing means 58 comprising a plurality of cooperating upper powered rolls 59*a*, 59*b*, 59*c*, as well as additional rolls, if necessary, which cooperate with a plurality of lower powered rolls 59*x*, 59*y*, 59*z* which are operative to draw shape 42*a* to form a third shape 42*b* thereof. Thereafter, the third shape 42*b* is fed past a machine 61 operative to perform an operation thereon. The machine 61, for example, may comprise a flying cut-off machine which is operative to cut the third shape 42*b* into predetermined lengths.

In FIG. 3 is shown an apparatus 40*c* including an extruder or continuous casting machine 41 for forming and feeding a first shape 42 to a powered take-off conveyor 43 which guides same into a rolling mill 44*c* comprising powered rollers 46*g*, 46*h*, 46*i* and 46*j*, as well as additional rollers, if necessary, which cooperate with rollers 45*g*, 45*h*, 45*i* and 45*j* in working the first shape 42 into a flat sheet 42'' which is guided therefrom into a slitting apparatus 62 comprising a plurality of slitting wheels 64 which operates to slit the sheet into a plurality of narrower sheet or strip members on a continuous basis.

While the apparatus of FIGS. 1-3 may be operated by respective continuous speed drive motors, it is preferably automatically controlled utilizing the media of feedback to maintain said automatic control so that each stage operates in a predetermined manner with respect to its adjacent stage or stages and all stages of the apparatus cooperate to provide a product of predetermined physical characteristics and dimensions.

The automatic control system provided in my application Ser. No. 142,405 filed Oct. 2, 1961, and now U.S. Pat. No. 3,422,648, may be modified and utilized to effect the automatic control of the various motors power operating the rolls and rollers, as well as the auxiliary apparatus illustrated in FIGS. 1-3. Accordingly, FIG. 4 illustrates components of an automatic control system of the type disclosed in said application Ser. No. 142,405 and applicable to the apparatus described herein. In FIG. 4, reference or command signals are generated by a signal-generating device 200 such as a magnetic tape recorder and reproduction unit or any suitable recording or generating means capable of generating a plurality of constant, predetermined command signals or reference signals which predeterminately vary during a forming operation of the type described. The reference signal generating unit 200 has a plurality of outputs 201, on each of which is generated a respective reference signal which is passed to a respective automatic control sub-system 203 denoted respectively 203*a*, 203*b*, and 203*c* in FIG. 4. The control subsystem 203*a* is illustrated in detail whereas the other control systems are not shown in detail but are assumed to have substantially the same components found in sub-system 203*a*.

In FIG. 4, notation 65 refers to the prime moving means or motor employed to move material through the extruder 41. Notation 66 refers to the motor or motors operating the rolling mill 44. Notation 67 refers to the motor or motors operating any of the described machinery situated downstream of the rolling mill for performing one or more operations on the rolled shape such as further forming same, welding or closing the tube, cutting off lengths of the tube, etc. Such apparatus is defined by the general notation 68 of FIG. 4 and by such notations as 58, 61 and 62 of FIGS. 1–3.

Each of the described motors or actuators 65, 66 and 67 are shown in FIG. 4 as being controlled by an electro-hydraulic pump servo system described in said application Ser. No. 142,405 and illustrated in detail in FIG. 4 within the box defined by notation 203*a*. Reference or analog signals are constantly generated on the output lines 201, one of which extends to the input of an electric stroker 204 which, in turn, controls the position of a slide block of a variable displacement hydraulic pump 206 through a hydraulic stroker 205. The block notations 203*b* and 203*c* contain similar components. The characteristics of the variable displacement hydraulic pump 206 are such that, depending on the position of the slide block thereof, which is controlled by the electro-hydraulic cylinder controlled thereby, it may pump in either direction and, hence, the position as well as the direction of the ram of the hydraulic cylinder controlled thereby will be a function of the amplitude of voltage of the signal generated in signal generator 200 and fed on the respective output line to the input of the electric stroker 204. Hence, automatic control of the position of the mandrel controlling the amount of material flowing through an extrusion die or continuous casting machine and/or the thickness of an extrusion may be effected in accordance with the amplitude or voltage of the reference signal applied to sub-system 203.

The feedback loop of the system 203 which controls the position and direction of motion of the ram 65' of the extrusion piston actuator 65 includes a potentiometer 208 having a wiper arm which is coupled, via gears or the like to the movement of ram shaft 206. Hence, the value of the resistance of 208 is a function of the position of the ram 206 and the piston 20 of the extrusion press 41. The command signal voltage generated by signal generator 200, which may be a constant reference voltage or one which predeterminately varies during a material forming cycle, is fed to a voltage comparator 203'' together with the feedback signal generated by potentiometer 208 to provide an error signal on the output of the comparator. The comparator 203'' may comprise a summing amplifier having its inputs connected to the signal generator 200 and the potentiometer 208 as illustrated. The output of the summing amplifier 203'' is used to control the electric stroker 204. Said output or error signal voltage is used to power the motor of the electric stroker 204 until the output of the feedback potentiometer 208 equals the voltage output of the signal generator 200 on the line extending to the input of the control sub-system 203*a*. The electric stroker motor in turn controls a valve plunger through precision gearing and, hence, effects the control of the hydraulic stroker 205. Thus, depending on the characteristics of the reference command signal generated by signal generator 200, the speed of operation of the ram of the extruder or the operation of means controlling the flow of metal to and from a continuous casting machine may be predetermined and kept constant or otherwise variably controlled in accordance with the requirements of operating the apparatus described.

If the extruder 41 is of the continuous operating screw type, notation 65 may refer to the gear motor drive therefore and the control potentiometer 208 may be replaced by a feedback signal generating tachometer coupled to be driven with the rotation of the feed screw of the extruder 41 and operative to provide a feedback signal to comparator 203'' and operative for controlling the speed of motor 65 which may remain constant during an extrusion cycle or predeterminately varied, depending on requisite variations in the operation of the other apparatus described.

The controllers 203b and 203 of FIG. 4 which derive respective reference or command control signals from the signal generator 200 are operative for respectively effecting control of the speed of the rolls of the rolling mill 54 and the power operated machinery 68 located downstream of the extruder 40. The controller 203b has similar components to those found in controller 203a and is operative to control the speed of motor 66 which drives one or more sets of rolls of the rolling mill 54. A closed loop speed control system is provided in which the output speed of motor 66 is measured by a feedback tachometer 66T driven by the shaft 66' of said motor which follows the speed command voltage resulting from the signal generated on the input line 201b to the controller 203b. If the rolling mill comprises a plurality of pairs of cooperating drive rolls, certain of which pairs or sets of pairs are adapted to operate at speeds which are different than those of other pairs, similar closed loop speed control systems of the type defined by notations 66T and 203b and each having a respective input reference signal line from the signal generator 200 may be provided to predeterminately control the speeds of the rolls of the rolling mill 54 in accordance with a preprogrammed operation.

The command signal generator 200 may be operative to generate a plurality of additional reference signals for controlling other motors operating the apparatus described, such as the motors driving the conveyors 43 and 43', tube mill 54 or other devices operating on the shape. It is assumed that motor 67 is to be speed controlled, and accordingly, the control sub-system 203c is similar in structure to the sub-system 203a and operates by comparing the reference voltage received on its input with a feedback voltage generated by a feedback tachometer 67T driven by the shaft 67' of the motor 67. The output of control system 203c is thus used to control the speed of motor 67.

In FIG. 4, notation 69 refers to a simple electrically operated device such as a cutting saw, punching means, resistance welding means or the like which may be operated without a feedback control loop by a signal generated on another channel of the output of signal generator 200.

Because of the flexibility inherent in the apparatus of FIG. 4 resulting from the ability to vary the operation of one or more lineal actuators such as the extrusion ram as well as the speed of operation of one or more rotary devices such as the powered rollers of the drawing and rolling mills and the tube-rolling mill described, the apparatus provided herein may be utilized to either (a) form elongated structural members of variable shape or cross section or (b) form different structural shapes of different shape, cross section or length, without major changes in setup. For example, depending on the characteristics of the reference signals generated by signal generator 200, the rolling mill 54 may be easily varied in its operation, after minor adjustments have been made in the spacing of the rollers or by changing certain of said rollers, to produce plate, sheet or other structural shapes which vary in thickness and cross section. Similarly, by minor modifications in setup, the tube-rolling mill of FIG. 1 may have the rolls or dies thereof changed or adjusted so as to produce tubes of different diameters and the means driving said mill may be easily varied in accordance with variables provided in the reference signals generated and fed thereto.

A system of the type provided in FIG. 4 or an equivalent system capable of effecting selective, adjustable automatic control of of extrusion, drawing and forming operations on a continuous basis also has additional operational advantages. For example, the degree which an extruded shape is drawn may be easily varied by varying the characteristics of the analog reference signal (i.e., its voltage) from one production run to another to permit different selected degrees of working the material while the rate of extrusion is maintained constant. The apparatus, due to the inherent ability to vary the operation of the drives for the extruder, the rolling mill and the other described means for operating on the work by merely generating reference signals of different characteristics, may thus be used without major changes in set-up to perform production research to determine optimum material characteristics. As the materials which are employed vary in physical characteristics, the extrusion rate and operation of the rolling mill may be varied to optimize the forming process.

The system illustrated in FIG. 4 may also be operated in an adaptive or overall feedback mode whereby variations in the characteristics of the material being worked may be sensed, such as variations in thickness or other characteristics, by a sensing means operative to generate a feedback signal which is fed to a computer of which the signal generator 200 forms a part and applied to a comparator means utilized for varying the reference signal generated to one or more of the sub-control systems 203 for varying the control of same to vary the operation of the servo device controlled thereby to optimize the operation or correct variations in the shape or characteristics of the material being worked to predetermine its final shape.

In another form of the invention it is noted that the apparatus of FIGS. 1–3 may be modified to include two or more extruders or continuous casting machines such as that denoted 41 or a single extruder with die openings for forming and feeding two members such as sheets or plates in the same direction to the bite of the illustrated rolling mills 44a, 44b, 44c for roll bonding or laminating the two sheets to form a unitary sheet formation thereof which may be utilized per se or further processed as described. For example, the two extruded shapes or sheets may be simultaneously reduced in thickness or otherwise changed in shape as they pass through the rolling mill and are roll bonded or laminated together to form a third sheet formation thereof of predetermined composite shape and characteristics. The two sheets so continuously extrusion formed may be made of the same or different materials and may comprise two different metals, two different polymers, two different ceramic materials or combinations of these materials. If both said sheets comprise metal both may be continuously cold or hot worked in the rolling mills described as they are roll bonded together. Or, depending on the metals employed, one metal may be cold or hot worked against the other in the rolling mill and reduced in thickness, embossed or changed in shape in situ on said other sheet without working said other sheet. Or the degree of working of both said sheets may vary in accordance with the workability of the two sheets as they pass through the rolling mill. If the two sheets comprise polymers they may be roll bonded or fused together by heating the rolls of the rolling mill to heat soften or melt material of at least one of the sheets. If the two sheets or extruded shapes comprise metal such as aluminum, titanium or steel or combinations of these or other metals, they may be provided oxide free as extrusion formed so as to be easily roll bonded together in the rolling mill. The term "roll bonding" as used herein includes the molecular bonding of metals as well as the fusion welding of plastics together.

I claim:

1. Continuous manufacturing apparatus comprising in combination:
   a. first means for forming a first metal shape from a supply of metal,
   b. second means operative to receive and guide said first metal shape from said first means,
   c. third means including a continuous shaping means having cooperating rollers defining a rolling mill operative to receive said first metal shape and to operate thereon continuously so as to change its cross section to a second shape,
   d. first power means for operating said first means,
   e. control means for said first power means,
   f. second power means for operating said third means,
   g. control means for said second power means
   h. fourth means operative to receive and guide said second shape from said third means, and
   i. automatic control means including signal generating means connected to said control for said first and second power means for controlling and synchronizing the operation of said first means and said third means so as to predeterminately form said second shape from said first shape.

2. An apparatus in accordance with claim 1 in which said automatic control means includes means for generating a first reference signal for controlling said control means for said first power means and means for generating a second reference signal simultaneously with generation of said first reference signal for controlling said control means for said second power means to effect synchronization in the operation of said first means and said third means in accordance with the characteristics of their respective reference signals.

3. An apparatus in accordance with claim 2, said first control means including first comparator means for controlling said first power means and said second control means including a second comparator means for controlling the operation of said third means, means for generating a first feedback signal which varies in accordance with variations in the operation of said first power means and means for feeding said feedback signal to said first comparator means for generating a first difference signal for controlling said first power means, means for generating a second feedback signal which varies in accordance with the operation of said second power means and feeding said second feedback signal to said second comparator means for generating a second difference signal for controlling said second power means whereby said third means may be operating in accordance with the reference signal fed to said second comparator means.

4. Apparatus in accordance with claim 3, wherein said rolling mill comprises a plurality of sets of cooperating powered rollers and separate motor means for driving each set of rollers to predeterminately vary the operation of same, a separate, automatic control means and comparator means for controlling each of said motors and means for generating separate reference signals and feeding same to each of said separate comparator means whereby the rolling mill may be operated to predeterminately shape said first shape to define a second shape thereof.

5. An apparatus in accordance with claim 3, including a further power operated means operative to predeterminately operate on said second shape, said reference signal generating means being operative to control the operation of said further power operated means in a predetermined manner during an operational cycle.

6. An apparatus in accordance with claim 2 wherein said first and second reference signals predeterminately vary during a forming operation.

7. An apparatus in accordance with claim 2, wherein each of said reference signals remains constant during a forming operation.

8. An apparatus in accordance with claim 1, wherein said first means is an extruder and said third means is operable to receive and change the shape of the extrusion.

9. An apparatus in accordance with claim 1, wherein said second means is a powered conveyor, said automatic control means being also operable to control operation of said conveyor to properly guide and drive said first shape from said first means.

10. An apparatus in accordance with claim 1, including fifth means operable on said second shape after it is formed to further change said shape.

11. An apparatus in accordance with claim 1, including fifth means operable on said second shape after it is formed to further change said second shape, said fifth means including a motor, control means for said motor operatively connected to said automatic control means.

12. Continuous manufacturing apparatus comprising in combination:
   first means for forming a first metal shape from a supply of metal,
   second means operative to receive and guide said first metal shape from said first means, third means including a continuous shaping means having cooperating rollers defining a rolling mill operative to receive said first metal shape and to operate thereon continuously so as to change its cross section to a second shape,
motor means for driving said rolling mill,
control means for said motor means,
fourth means operative to receive and guide said second shape from said third means, and
automatic control means including a command signal generating means connected to said control means for said rolling mill motor means for controlling the operation of said third means so as to predeterminately form said second shape from said first shape.

* * * * *